United States Patent
Yamamoto et al.

(10) Patent No.: US 7,232,211 B2
(45) Date of Patent: Jun. 19, 2007

(54) INKJET RECORDING INK, INKJET RECORDING METHOD, INK CARTRIDGE, AND INKJET RECORDING SYSTEM

(75) Inventors: Tomoya Yamamoto, Mitsukaido (JP); Yukiko Tachibana, Misukaido (JP); Hitoshi Inoue, Mitsukaido (JP); Ryoji Yashiro, Mitsukaido (JP); Takayuki Ookawa, Mitsukaido (JP); Junko Morioka, Mitsukaido (JP)

(73) Assignee: Canon Finetech Inc., Mitsukaido-shi (JP)

( * ) Notice: Subject to any disclaimer, the term of this patent is extended or adjusted under 35 U.S.C. 154(b) by 220 days.

(21) Appl. No.: 10/518,077

(22) PCT Filed: Dec. 18, 2003

(86) PCT No.: PCT/JP03/16274

§ 371 (c)(1),
(2), (4) Date: Dec. 16, 2004

(87) PCT Pub. No.: WO2004/058903

PCT Pub. Date: Jul. 15, 2004

(65) Prior Publication Data

US 2006/0044374 A1    Mar. 2, 2006

(30) Foreign Application Priority Data

Dec. 24, 2002 (JP) .............................. 2002-372547
Dec. 26, 2002 (JP) .............................. 2002-378670
Dec. 26, 2002 (JP) .............................. 2002-378671
Dec. 26, 2002 (JP) .............................. 2002-378672

(51) Int. Cl.
*G01D 11/00* (2006.01)

(52) U.S. Cl. .................. 347/100; 347/95; 523/160

(58) Field of Classification Search ................ 347/100, 347/95, 96, 101; 106/31.6, 31.27, 31.13, 106/31.32; 523/160
See application file for complete search history.

(56) References Cited

U.S. PATENT DOCUMENTS

| 5,519,085 | A | 5/1996 | Ma et al. | |
|---|---|---|---|---|
| 6,378,999 | B1* | 4/2002 | Doi et al. | 347/100 |
| 2002/0049261 | A1* | 4/2002 | Soga et al. | 523/160 |

FOREIGN PATENT DOCUMENTS

| EP | 1 184 427 A2 | 3/2002 |
|---|---|---|
| EP | 1 245 396 A2 | 10/2002 |
| JP | 8-176480 A | 7/1996 |
| JP | 2002-127586 A | 5/2002 |
| JP | 2002-97395 | 10/2003 |

OTHER PUBLICATIONS

D2: The Society of Polymer Science Japan, New Edition Polymer Dictionary, First edition, Asakura Shoten, Nov. 25, 1988, p. 213.
English Translation of International Preliminary Examination Report dated Dec. 1, 2004.
European Search Report dated Nov. 22, 2006.

* cited by examiner

*Primary Examiner*—Manish S. Shah
(74) *Attorney, Agent, or Firm*—Harness, Dickey & Pierce, P.L.C.

(57) ABSTRACT

An inkjet recording ink is composed of an encapsulated water-insoluble colorant encapsulated with a high-molecular dispersant, a water-soluble organic solvent, and water. The water-insoluble colorant is at least one colorant selected from the group consisting of C.I. Solvent Yellow 21, 42, 79, 82, 83:1, 88 and 151, at least one colorant selected from the group consisting of C.I. Solvent Red 8, 49, 83:1, 91, 127 and 218, at least one colorant selected from the group consisting of C.I. Solvent Black 3, 27, 29 and 45, or at least one colorant selected from the group consisting of C.I. Solvent Blue 25, 38, 44, 67 and 70. The high-molecular dispersant is a block copolymer comprising at least one hydrophobic block and at least one hydrophilic block, which have been obtained by polymerizing vinyl ethers as monomers, respectively. The inkjet recording ink can stably record images of high fastness and excellent quality over a long period even under severe environmental conditions.

14 Claims, 3 Drawing Sheets

INKJET RECORDING INK, INKJET RECORDING METHOD, INK CARTRIDGE, AND INKJET RECORDING SYSTEM

TECHNICAL FIELD

This invention relates to an inkjet recording ink (hereinafter simply called "ink"), an inkjet recording method, an ink cartridge and an inkjet recording system. More specifically, the present invention is concerned with an ink of the colorant dispersion type having high ejection reliability, permitting formation of images of good characteristics and suited for inkjet recording and is also concerned with an inkjet recording method, ink cartridge and inkjet recording system all of which make use of the ink.

BACKGROUND ART

As colorants for printing inks, water-insoluble colorants excellent in fastness such as waterproofness and light fastness, for example, pigments have been used widely to date. To use a water-insoluble colorant as a colorant for a water-based ink, it is required to stably disperse the water-insoluble colorant in an aqueous medium. Water-based inks of the colorant dispersion type are hence used, each of which contains a water-insoluble colorant evenly dispersed in an aqueous medium by the addition of a dispersant such as a high-molecular compound or surfactant.

In recent years, water-based inks of such colorant dispersion type have also finding utility in inkjet recording from the standpoint of image fastness. In inkjet recording, it is attempted to provide colorant dispersion particles, which are dispersed in an ink, with agglomerating property and water-insolubility so that the ink would be able to exhibit improved fixing property and waterproofness on paper. The provision of such properties to the colorant dispersion particles, however, leads to a reduction in the dispersion stability of the colorant dispersion particles in the ink, thereby developing potential problems such that the colorant dispersion particles may agglomerate and settle during storage of the ink, the resulting images tend to exhibit uneven print density, and due to drying of the ink, clogging tend to occur at nozzle tips of an inkjet recording system to result in reduced ejection stability.

In an attempt to solve the above-described problems, an ink—which contains a block copolymer formed of at least one hydrophobic segment and at least one hydrophilic segment and also, an oil-soluble dye—is proposed in JP 2002-97395 A. This ink has stability as a dispersion, but as an ink for use in an inkjet recording system, its ejection stability is still too low to reach a practicable level.

With the foregoing problems in view, the present invention, therefore, has as objects thereof the provision of an ink capable of stably recording images of high fastness and excellent quality over a long period even under severe environmental conditions and also the provision of an inkjet recording method, ink cartridge and inkjet recording system all of which make it possible to record images of superb fastness and quality.

DISCLOSURE OF THE INVENTION

The present inventors have proceeded with an extensive investigation to solvent the above-described problems. As a result, it has been found that they can be solved by the invention to be described hereinafter. Described specifically, the present invention provides an inkjet recording ink composed of a high-molecular dispersant, a water-insoluble colorant, a water-soluble organic solvent and water, characterized in that the water-insoluble colorant is at least one colorant selected from the group consisting of C.I. Solvent Yellow 21, C.I. Solvent Yellow 42, C.I. Solvent Yellow 79, C.I. Solvent Yellow 82, C.I. Solvent Yellow 83:1, C.I. Solvent Yellow 88 and C.I. Solvent Yellow 151, at least one colorant selected from the group consisting of C.I. Solvent Red 8, C.I. Solvent Red 49, C.I. Solvent Red 83:1, C.I. Solvent Red 91, C.I. Solvent Red 127 and C.I. Solvent Red 218, at least one colorant selected from the group consisting of C.I. Solvent Black 3, C.I. Solvent Black 27, C.I. Solvent Black 29 and C.I. Solvent Black 45, or at least one colorant selected from the group consisting of C.I. Solvent Blue 25, C.I. Solvent Blue 38, C.I. Solvent Blue 44, C.I. Solvent Blue 67 and C.I. Solvent Blue 70; and the high-molecular dispersant is a block copolymer comprising at least one hydrophobic block and at least one hydrophilic block, and the at least one hydrophobic block and at least one hydrophilic block have been obtained by polymerizing vinyl ethers as monomers, respectively.

In the above-described ink, it is preferred that the hydrophilic block in the high-molecular dispersant is formed of an anionic vinyl ether; that the hydrophilic block in the high-molecular dispersant is formed of a nonionic vinyl ether; that the hydrophilic block in the high-molecular dispersant is formed of at least two blocks consisting of a block formed of a nonionic vinyl ether and a block formed of an anionic vinyl ether; that the high-molecular dispersant comprises at least three blocks consisting of a block formed of a hydrophobic vinyl ether, a block formed of a nonionic hydrophilic vinyl ether and a block formed of an anionic hydrophilic vinyl ether; that particles of the water-insoluble colorant dispersed by the high-molecular dispersant have an average particle size not greater than 80 nm.

The present invention also provides an inkjet recording method, which is conducted by applying energy to an ink to cause the ink to fly onto a recording medium, characterized in that the ink is any one of the above-described inks according to the present invention. As the energy, thermal energy is preferred, and the recording medium may preferably have an ink-receiving coating layer on at least one of opposite sides thereof.

The present invention also provides an ink cartridge provided with an ink reservoir with an ink stored therein, characterized in that the ink is any one of the above-described inks according to the present invention. The present invention further provides an inkjet recording system provided with an ink cartridge, which is provided with an ink reservoir with an ink stored therein, and also with a recording head portion for ejecting the ink, characterized in that the ink is any one of the above-described inks according to the present invention.

BEST MODES FOR CARRYING OUT THE INVENTION

Figure 1:
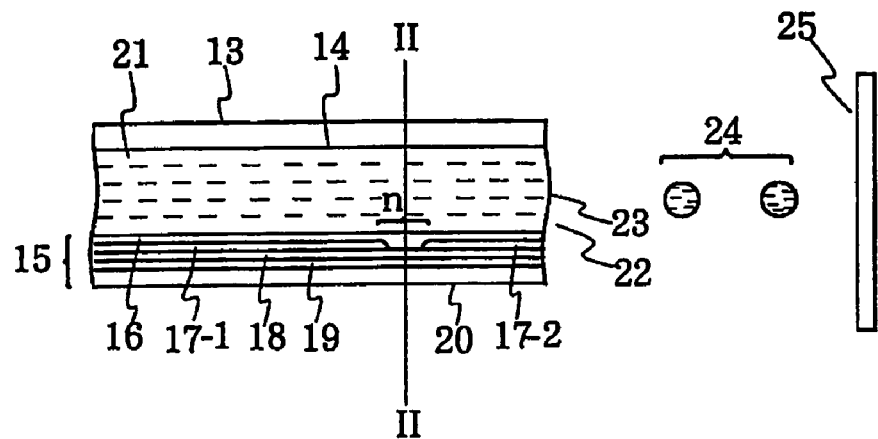
FIG. 1 is a fragmentary vertical cross-sectional view of a recording head in one embodiment of the inkjet recording system according to the present invention.

The present invention will hereinafter be described in detail.

The present inventors have found that use of the above-described ink according to the present invention makes it possible to stably record images of high fastness and excellent quality even under severe environmental conditions.

The above stable recording can be attributed primarily to the use of the block copolymer, which comprises at least one hydrophobic block and at least one hydrophilic block, as the high-molecular dispersant. Such hydrophobic blocks can evenly adhere to the surfaces of particles of the colorant so that the high-molecular dispersant evenly covers, in other words, encapsulates the colorant particles without their exposure to the air. As each hydrophobic block is in the form of a polyvinyl ether obtained by polymerizing a vinyl ether as a monomer and containing many ether structures, it is considered that electrostatic interactions occur between ether portions in the hydrophobic block(s) of each high-molecular dispersant molecule and ether portions in hydrophobic blocks of adjacent high-molecular dispersant molecules, in other words, physical bonds are formed between hydrophobic blocks in molecules of the high-molecular dispersant.

Such physical bonds are considered to improve the stability of the capsules so that, even upon ejection at which the state of dispersion tends to become unstable in inkjet recording, the encapsulated state may be stably maintained to lead to an improvement in ejection stability. Further, the colorant is also considered to be protected by the stable capsules of the high-molecular dispersant even in printed images after recording, and hence, the colorant is considered to exhibit fastness improved over the fastness in such a case that colorant particles are exposed at parts thereof to the air from the beginning or upon ejection. In addition, as the hydrophilic portion(s) of the high-molecular dispersant is in the form of block(s), the high-molecular dispersant is considered to have good compatibility with an ink medium so that, compared with one making use of a high-molecular dispersant subjected to random polymerization and containing hydrophobic group(s), the dispersed colorant particles are presumably provided with significantly improved dispersion stability. These improvements are considered to render the dispersed colorant particles far less susceptible to agglomeration and settling and therefore, to bring about improvements not only in ejection stability but also in ink stability during long-term storage.

As a still further problem upon using in an inkjet recording system an ink with dispersed colorant particles contained therein, the dispersion stability of the dispersed colorant particles may be extremely lowered to result in nozzle clogging when the water in the ink evaporates at nozzle tips of a recording head and the ink is thus concentrated there. The present inventors have also conducted an extensive investigation on this problem, and have found that the compatibility of the hydrophobic block(s) in the high-molecular dispersant with the colorant can be improved by using, as a water-insoluble colorant, at least one colorant selected from the group consisting of C.I. Solvent Yellow 21, C.I. Solvent Yellow 42, C.I. Solvent Yellow 79, C.I. Solvent Yellow 82, C.I. Solvent Yellow 83:1, C.I. Solvent Yellow 88 and C.I. Solvent Yellow 151, at least one colorant selected from the group consisting of C.I. Solvent Red 8, C.I. Solvent Red 49, C.I. Solvent Red 83:1, C.I. Solvent Red 91, C.I. Solvent Red 127 and C.I. Solvent Red 218, at least one colorant selected from the group consisting of C.I. Solvent Black 3, C.I. Solvent Black 27, C.I. Solvent Black 29 and C.I. Solvent Black 45, or at least one colorant selected from the group consisting of C.I. Solvent Blue 25, C.I. Solvent Blue 38, C.I. Solvent Blue 44, C.I. Solvent Blue 67 and C.I. Solvent Blue 70. As a result, the dispersion stability of the dispersed colorant particles has become far less susceptible to a reduction even in the course of printing by an inkjet printer which features substantial evaporation of water from the ink. The use of such an oil-soluble dye has made it possible to stably eject the ink over a long period without occurrence of nozzle clogging.

The constituents of the ink according to the present invention will hereinafter be described in detail.

(Water-Insoluble Colorant)

The water-insoluble colorant for use in the ink of the present invention is at least one colorant selected from the group consisting of C.I. Solvent Yellow 21, C.I. Solvent Yellow 42, C.I. Solvent Yellow 79, C.I. Solvent Yellow 82, C.I. Solvent Yellow 83:1, C.I. Solvent Yellow 88 and C.I. Solvent Yellow 151, at least one colorant selected from the group consisting of C.I. Solvent Red 8, C.I. Solvent Red 49, C.I. Solvent Red 83:1, C.I. Solvent Red 91, C.I. Solvent Red 127 and C.I. Solvent Red 218, at least one colorant selected from the group consisting of C.I. Solvent Black 3, C.I. Solvent Black 27, C.I. Solvent Black 29 and C.I. Solvent Black 45, or at least one colorant selected from the group consisting of C.I. Solvent Blue 25, C.I. Solvent Blue 38, C.I. Solvent Blue 44, C.I. Solvent Blue 67 and C.I. Solvent Blue 70. These water-insoluble colorants can be used either singly or in combination.

The content of the water-insoluble colorant in the ink may be preferably from 0.1 to 20 wt. %, more preferably from 1.0 to 10 wt. % based on the whole weight of the ink. A colorant content lower than 0.1 wt. % may have difficulty in providing sufficient image density in some instances, while a colorant content higher than 20 wt. % may lead to a reduction in ink ejection stability due to clogging or the like at nozzles in some instances.

The average particle size of colorant dispersion particles which the water-insoluble colorant forms with the high-molecular dispersant in the ink may be preferably 80 nm or smaller, more preferably 50 nm or smaller. This average particle size leads to a further improvement in ejection stability, and also to printed images of better color-producing property. Examples of a method for measuring the particle size of the colorant dispersion particles include laser light scattering, X-ray small-angle scattering, settling, and direct electron microscopic observation.

(High-Molecular Dispersant)

In the present invention, the high-molecular dispersant for use in the ink is required to be a block copolymer comprising at least one hydrophilic block and at least one hydrophobic block. Those containing one or more hydrophobic blocks and two or more hydrophilic blocks or those containing two or more hydrophobic blocks and one or more hydrophilic blocks can also be used. These two or more hydrophilic blocks and/or these two or more hydrophobic blocks may be of the same type or of different types. As the block copolymer, a single block copolymer or a blend of two or more block copolymers can be used. The structure of each copolymer can be linear, graft or the like, although a linear block copolymer is preferred.

As the high-molecular dispersant, one obtained by polymerizing vinyl ethers as monomers and containing a polyvinyl ether structure is preferred because it forms a stable dispersion with colorant particles. Particularly preferred is a high-molecular dispersant at least one hydrophilic block of which is either an anionic polyvinyl ether block or a diblock copolymer composed of a nonionic polyvinyl ether block and an anionic polyvinyl ether block, because the colorant particles dispersed in the ink medium are provided with further improved stability. When the at least one hydrophilic block of the high-molecular dispersant is a diblock copolymer composed of a nonionic polyvinyl ether block and an anionic polyvinyl ether block, a block copolymer composed of a polyvinyl ether block having hydrophobicity, the nonionic polyvinyl ether block having hydrophilicity and the anionic polyvinyl ether block having hydrophilicity in this order is more desired because the colorant particles dispersed in the ink medium are provided with still further improved stability.

As the polyvinyl ether block having hydrophobicity and forming the above-described high-molecular dispersant, a block having a recurring unit structure represented by the following formula (1) is preferred:

  (1)

In the above-described formula (1), $R^1$ represents an aliphatic hydrocarbon group such as an alkyl, alkenyl, cycloalkyl or cycloalkenyl group; or an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group. One or more of the hydrogen atoms on the aromatic ring may be substituted by hydrocarbon groups. The carbon number of $R^1$ may preferably range from 1 to 18.

$R^1$ can also be a group represented by $-(CH(R^2)-CH(R^3)-O)_p-R^4$ or $-(CH_2)_m-(O)_n-R^4$. In this case, $R^2$ and $R^3$ each independently represents a hydrogen atom or a methyl group, and $R^4$ represents an aliphatic hydrocarbon group such as an alkyl, alkenyl, cycloalkyl or cycloalkenyl group, an aromatic hydrocarbon group one or more of carbon atoms of which may be substituted by nitrogen atoms, such as a phenyl, pyridyl, benzyl, toluyl, xylyl, alkylphenyl, phenylalkyl, biphenyl or phenylpyridyl group, with one or more hydrogen atoms on the aromatic ring being optionally substituted by hydrocarbon groups, $-CO-CH=CH_2$, $-CO-C(CH_3)=CH_2$, $-CH_2-CH=CH_2$, $-CH_2-C(CH_3)=CH_2$. In each of these groups, one or more hydrogen atoms may be substituted by halogen atoms such as fluorine, chlorine or bromine atoms to chemically feasible extent. The carbon number of $R^4$ may preferably range from 1 to 18. Preferably, p can range from 1 to 18, m can range from 1 to 36, and n can be 0 or 1.

In $R^1$ and $R^2$, examples of the alkyl and alkenyl groups can include methyl, ethyl, propyl, isopropyl, n-butyl, sec-butyl, t-butyl, pentyl, hexyl, heptyl, octyl, nonyl, decyl, dodecyl, tetradecyl, hexadecyl, octadecyl, oleyl and linolyl, and examples of the cycloalkyl and cycloalkenyl groups can include cyclopropyl, cyclobutyl, cyclopentyl, cyclohexyl, cyclooctyl and cyclohexenyl.

As the polyvinyl ether block having hydrophilicity, on the other hand, a block having a recurring unit structure represented by the following formula (2) is preferred:

  (2)

In the above-described formula (2), $R^5$ is a group represented by $-(CH_2-CH_2-O)_k-R^6$, $-(CH_2)_m-(O)_n-R^6$, $-R^7-X$, $-(CH_2-CH_2-O)_k-R^7-X$ or $-(CH_2)_m-(O)_n-X$. In this case, $R^6$ represents a hydrogen atom, a linear or branched $C_{1-4}$ alkyl group, $-CO-CH=CH_2$, $-CO-C(CH_3)=CH_2$, $-CH_2-CH=CH_2$, $-CH_2-C(CH_3)=CH_2$, and $R^7$ represents an aliphatic hydrocarbon group such as an alkylene, alkenylene, cycloalkylene or cycloalkenylene group, or an aromatic hydrocarbon group one or more of carbon atoms of which may be substituted by nitrogen atoms, such as a phenylene, pyridylene, benzylene, toluylene, xylylene, alkylphenylene, phenylenealkylene, biphenylene or phenylpyridylene group, with one or more hydrogen atoms on the aromatic ring being optionally substituted by hydrocarbon groups. In each of these groups, one or more hydrogen atoms may be substituted by halogen atoms such as fluorine, chlorine or bromine atoms to chemically feasible extent. X represents a group having anionic property, such as a carboxylate, sulfonate or phosphate group. The carbon number of $R^7$ may preferably range from 1 to 18. Preferably, k can range from 1 to 18, m can range from 1 to 36, and n can be 0 or 1.

Structures of the above-described monomers (I-a to I-o) and block copolymers (II-a to II-e) composed of the monomers will be exemplified below, although the structures of block copolymers usable in the present invention are not limited to them.

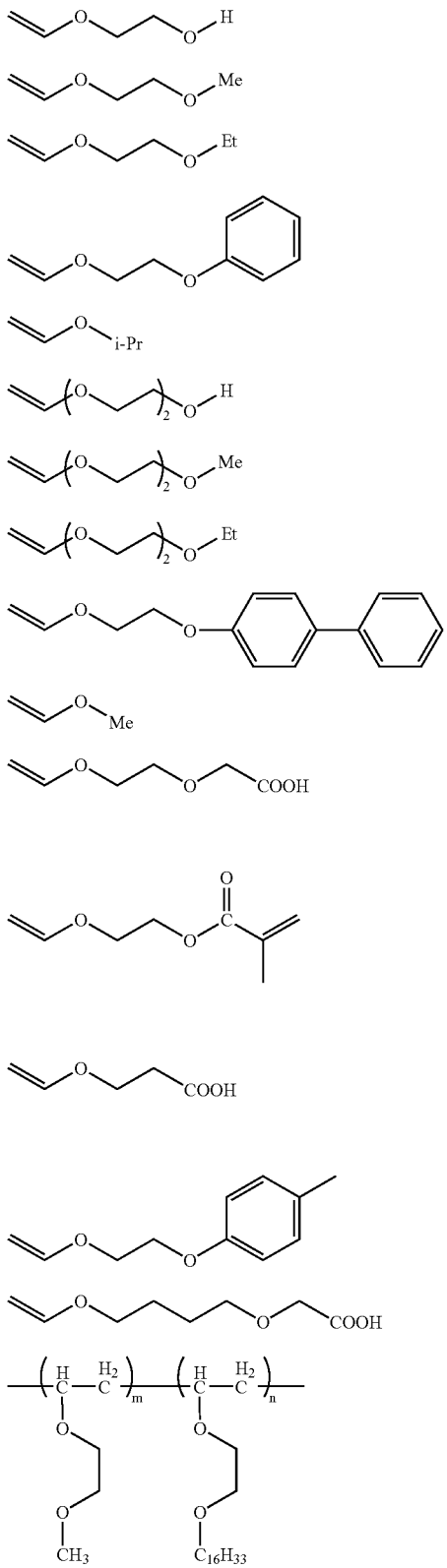

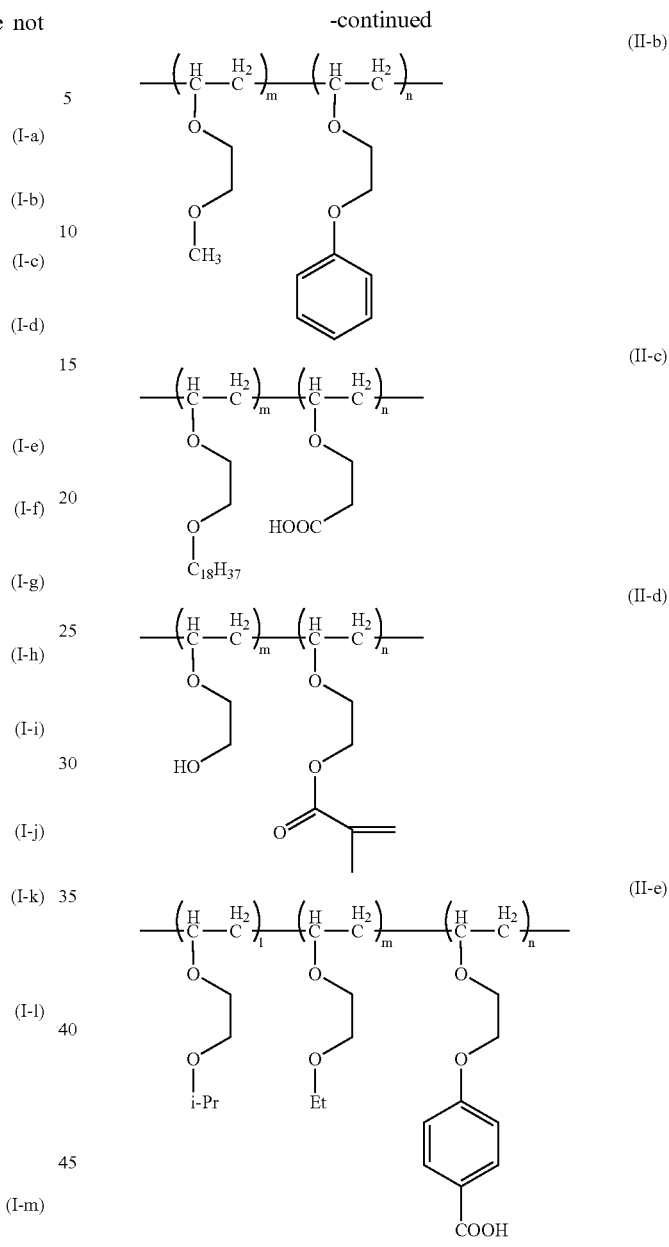

The preferred numbers of the respective recurring units in the block copolymers (i.e., m, n and l in the above-exemplified recurring units (II-a) to (II-e)) may each independently range from 1 to 10,000. More preferably, their total (i.e., m+n+l in the above-exemplified recurring units (II-a) to (II-e)) may range from 10 to 20,000. The number average molecular weight may range preferably from 500 to 20,000,000, more preferably from 1,000 to 5,000,000, most preferably from 2,000 to 2,000,000.

The proportion of such a high-molecular dispersant in an ink may be preferably from 0.1 to 20 wt. %, more preferably from 0.5 to 10 wt. % based on the whole weight of the ink. Further, the preferred content ratio of the high-molecular dispersant to the water-insoluble colorant in the ink may range from 1:100 to 2:1. This range leads to an improvement in ink ejection stability and also to an improvement in the storage stability of particles dispersed in the ink.

(Water-Soluble Organic Solvent)

As the water-soluble organic solvent in the ink for use in the present invention, any organic solvent can be used insofar as it is soluble in water. Two or more water-soluble organic solvents can be used in combination as a mixed solvent. When employed as such a mixed solvent, a solid, water-soluble organic compound may be contained insofar as the mixed solvent is liquid.

Among such water-soluble organic solvents, those having solubility parameters in a range of from 0.0 to +10.0 $(J/cm^3)^{1/2}$ relative to the solubility parameter of hydrophilic block units in the high-molecular dispersant are preferred because they render inkjet heads less susceptible to nozzle blocking. This solubility parameter ($\delta(J/cm^3)^{1/2}$) is expressed as the square root of the cohesive energy density of each solvent, and is a value which is calculated in accordance with the formula, $\delta=(\Delta E/V)^{1/2}$ wherein $\Delta E$ represents the molar heat of evaporation of the solvent and V represents the molar volume of the solvent, and which is a value inherent to the solvent and indicative of the solubility of the solvent. For example, $\delta=47.0$ in the case of water, $\delta=25.7$ in the case of ethanol, and $\delta=14.9$ in the case of hexane.

On the other hand, the solubility parameter ($\delta$) of the high-molecular dispersant is a value empirically calculated under the assumption that the solubility parameter of a solvent capable of providing the high-molecular dispersant with the infinite solubility or the maximum degree of swelling is equal to the solubility parameter of the high-molecular dispersant. As the solubility parameters of the high-molecular dispersant and water-soluble organic solvent in the present invention, values calculated from the molecular cohesion energies of the functional groups in the high-molecular dispersant and water-soluble organic solvent are used. As a method for calculating the solubility parameters ($\delta$) of the high-molecular dispersant and water-soluble organic solvent from the molecular cohesion energies of their functional groups, calculations can each be made in accordance with the following formula: $\delta=(\Delta E/V)^{1/2}=(\Sigma \Delta e_i / \Sigma \Delta v_i)^{1/2}$ wherein $\Delta E$ represents the molar heat of evaporation, V represents the molar volume, $\Delta e_i$ represents the energy of evaporation of the atomic group (J/mol), and $\Delta v_i$ represents the molar volume of the atomic group (cm$^3$/mol). Incidentally, the energy of evaporation of each atomic group and the molar volume of each atomic group were calculated using the Foders constants.

Examples of such water-soluble organic solvents can include lower alcohols such as methyl alcohol, ethyl alcohol, n-propyl alcohol, isopropyl alcohol, n-butyl alcohol, sec-butyl alcohol and tert-butyl alcohol; diols such as ethylene glycol, diethylene glycol, triethylene glycol, tetraethylene glycol, propylene glycol, dipropylene glycol, tripropylene glycol, 1,2-butanediol, 1,3-butanediol, 1,4-butanediol, thiodiglycol, neopentylglycol, 1,4-cyclohexanediol and polyethylene glycol; glycol ethers such as ethylene glycol monomethyl ether, ethylene glycol monoethyl ether, ethylene glycol monoisoproyl ether, ethylene glycol monoallyl ether, diethylene glycol monomethyl ether, diethylene glycol monoethyl ether, triethylene glycol monomethyl ether, triethylene glycol monoethyl ether, propylene glycol monomethyl ether and dipropylene glycol monomethyl ether; triols such as glycerin, 1,2,4-butanetriol, 1,2,6-hexanetriol, 1,2,5-pentanetriol, trimethylolethane, trimethylolpropane and pentaerythritol; cyclic ethers such as tetrahydrofuran and dioxane; dimethylsulfoxide, glycerin monoallyl ether, N-methyl-2-pyrrolidone, 2-pyrrolidone, γ-butyrolactone, 1,3-dimethyl-2-imidazolidinone, sulfolane, β-dihydroxyethylurea, urea, acetonylacetone, dimethylformamide, dimethylacetamide, acetone, and diacetone alcohol.

Among these, water-soluble organic solvents the boiling points of which are 120° C. or higher are preferred because their use can inhibit ink concentration at nozzle tips. The proportion of such a water-insoluble organic solvent in the ink may range preferably from 5 to 50 wt. %, more preferably from 10 to 30 wt. % based on the whole weight of the ink.

The foregoing are the constituents of the water-based ink for use in the present invention. In addition to these constituents, a variety of additives can be incorporated including surfactants, pH adjusters, antioxidants and antimolds.

The inkjet recording method according to the present invention is characterized in that upon conducting inkjet recording by applying energy to an ink to cause the ink to fly, the above-described ink is used. Thermal energy or mechanical energy can be used as the energy, although use of thermal energy is preferred.

No particular limitation is imposed on a recording medium for use in the inkjet recording method of the present invention. Nonetheless, a recording medium provided on at least one side thereof with an ink-receiving coating layer, which is commonly called "exclusive inkjet paper", or a like recording medium can be used preferably. Desired is, for example, a recording medium provided on at least one side thereof with an ink-receiving coating layer which contains at least a hydrophilic polymer and/or an inorganic porous material. A description will hereinafter be made of one embodiment of the inkjet recording system according to the present invention, which is suited for use in performing recording with the above-described ink of the present invention.

(Inkjet Recording System Making Use of Thermal Energy)

Figure 2:
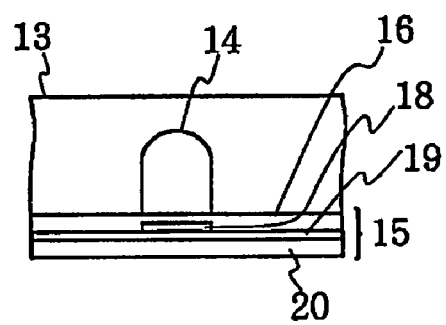
FIG. 2 is a fragmentary transverse cross-sectional view of the recording head shown in FIG. 1.

Illustrated in FIGS. 1 and 2 is a recording head as a principal unit in the inkjet recording system making use of thermal energy. FIG. 1 is a fragmentary vertical cross-sectional view of the recording head 13 as taken along an ink channel, and FIG. 2 is a fragmentary transverse cross-sectional view of the recording head 13 as taken along line II—II of FIG. 1. The recording head 13 has been obtained by bonding a glass, ceramic, silicon or plastic plate, which is provided with an ink channel (nozzle) 14 to feed an ink therethrough, with a heating element plate 15. The heating element plate 15 is composed of a protective layer 16 formed of silicon oxide, silicon nitride or silicon carbide, electrodes 17-1, 17-2 formed of aluminum, gold, an aluminum-copper alloy or the like, a heating resistor layer 18 formed of a high melting-point material such as HfB$_2$, TaN, TaAl or the like, a heat storage layer 19 formed of thermal silicon dioxide, aluminum oxide or the like, and a substrate 20 formed of a material having high heat-dissipating property such as silicon, aluminum or aluminum nitride.

Figure 3:
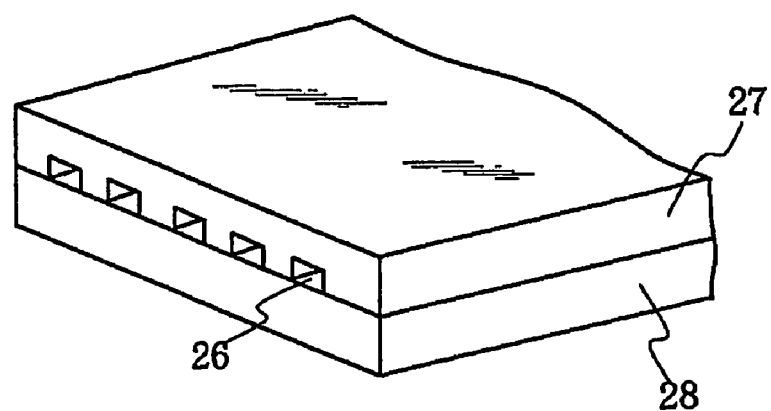
FIG. 3 is a fragmentary external perspective view of a multiple-nozzle recording head formed of a multiplicity of recording heads as shown in FIGS. 1 and 2.

When pulse-like electrical signals are applied across the electrodes 17-1 and 17-2 of the recording head 13, the heating element plate 15 is promptly caused to produce heat at a region indicated by "n" so that bubbles rise in an ink 21 which is in contact with a surface of the region. Under a pressure of the bubbles, a meniscus 23 is formed. As a result, the ink 21 is ejected through the nozzle 14 of the recording head 13, and from an ejection orifice 22, the ink 21 is caused to fly as ink droplets 24 toward a recording medium 25. Depicted in FIG. 3 is an external appearance of a part of a multiple-nozzle recording head formed by arranging side by side a multiplicity of recording heads as shown in FIGS. 1 and 2. This multiple-head recording head has been fabricated by bonding a glass plate 27, which is provided with a multiplicity of nozzles 26, with a similar heating head 28 as in FIG. 1.

Figure 4:
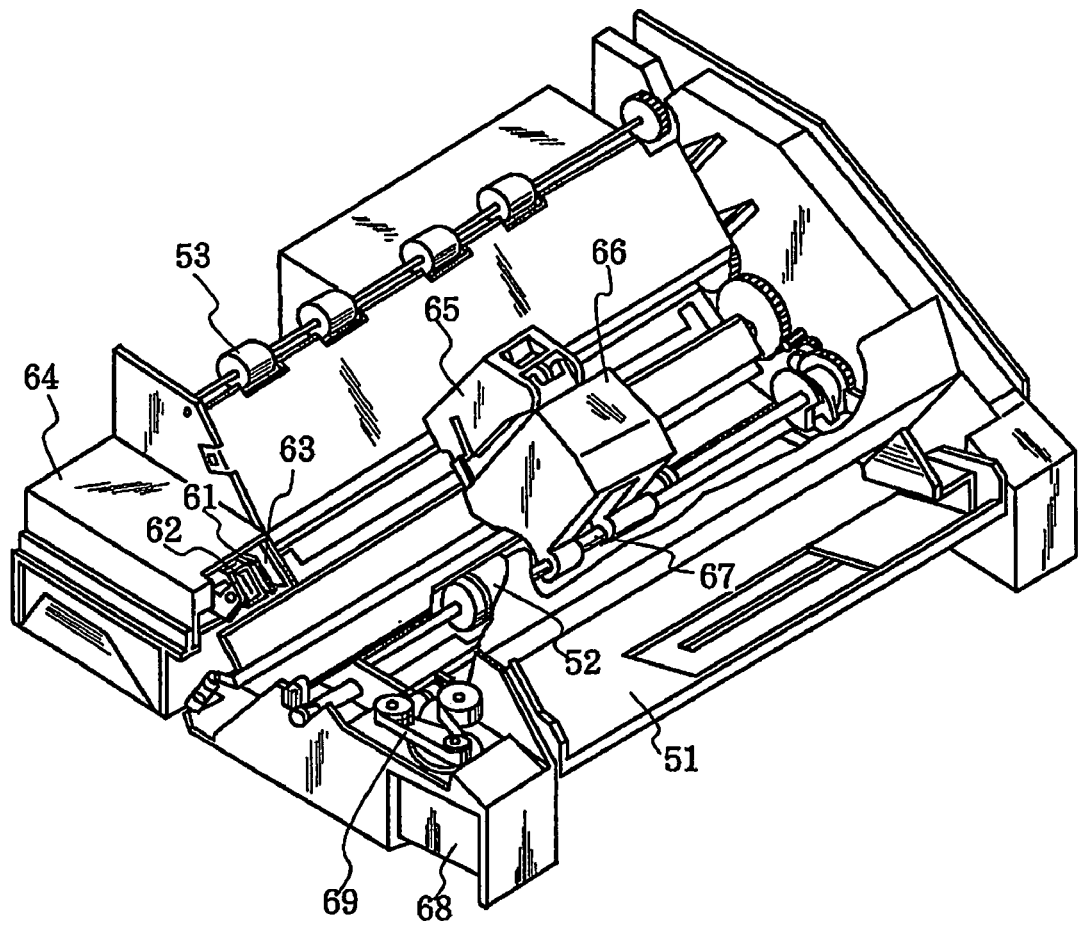
FIG. 4 is a simplified perspective view illustrating one embodiment of the inkjet recording system according to the present invention.

FIG. 4 shows an illustrative inkjet recording system with the multiple-head recording head assembled therein. Designated at numeral 61 is a blade as a wiping member, which is held and fixed at an end thereof by a blade holding member so that the blade takes the form of a cantilever. The blade 61 is arranged at a position adjacent to a record area by a recording head 65. In the illustrated embodiment, the blade 61 is held in such a way as protruding in a travel path of the recording head 65.

Numeral 62 indicates a cap for ink-ejecting orifices of the recording head 65. The cap 62 is arranged at a home position adjacent to the blade 61, and is movable in a direction perpendicular to a moving direction of the recording head 65 such that it is brought into contact with an orifice plate, in which the ink-ejecting orifices are defined, to perform capping. Further, numeral 63 is an ink absorber pad arranged in the neighborhood of the blade 61, and like the blade 61, the ink absorber pad 63 is held in such a way as protruding in the travel path of the recording head 65. The blade 61, cap 62 and ink absorber pad 63 make up a service station 64, and by the blade 61 and ink absorber pad 63, water, dust and the like are removed from the orifice plate in which the ink-ejecting orifices are defined.

The recording head 65 has an ejection energy producing means for ejecting an ink against a recording medium positioned opposite the orifice plate, in which the ink-ejecting orifices are defined, to perform recording. Designated at numeral 66 is a carriage on which the recording head 65 is mounted for movements. The carriage 66 is maintained in slidable engagement with a guide rod 67, and is connected at a part thereof with a drive belt 69 driven by a motor 68 although the connection itself is not shown in the drawing. The carriage 66 is, therefore, movable along the guide rod 67 so that the recording head 65 is allowed to move over the record are and its adjacent areas.

Numeral 51 indicates a paper feed section into which recording media can be inserted, while numeral 52 designates paper feed rollers driven by an unillustrated motor. By these members, a recording medium is fed to a position located opposite the orifice plate of the recording head 65. As recording proceeds, the recording medium is progressively ejected to a paper eject section in which paper eject rollers 53 are arranged. When the recording head 65 returns to its home position subsequent to completion of recording in the above-described construction, the cap 62 of the service station 64 is shunted from the travel path of the recording head 65 but the blade 61 protrudes in the travel path. As a result, the ink-ejecting orifices of the recording head 65 are wiped.

Upon bringing the cap 62 into contact with the orifice plate of the recording head 65 to perform capping, the cap 62 is moved to protrude into the travel path of the recording head 65. When the recording head 65 moves from its home position to a record starting position, the cap 62 and the blade 61 are located at the same positions as the above-described positions where they were located at the time of the wiping. As a consequence, the orifice plate of the recording head 65 is also wiped in this movement. The above-mentioned movement of the recording head to its home position takes place upon completion of recording and upon restoration of ejection. While the recording head 65 is moving over the record area to perform recording, the recording head 65 is caused to move at predetermined intervals to its home position located adjacent the record area. With these movements, wiping is performed.

Figure 5:
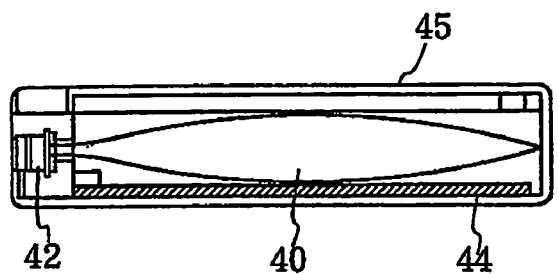
FIG. 5 is a vertical cross-sectional view of one embodiment of the ink cartridge according to the present invention.

FIG. 5 is a vertical cross-sectional view of one embodiment of the ink cartridge which stores therein an ink to be fed to the recording head via an ink feed member, for example, a tube. Designated at numeral 40 is an ink reservoir, for example, an ink bag in which a feed ink is stored. A rubber-made plug 42 is arranged in an end of the ink bag 4o. Insertion of a needle (not shown) into the plug 42 makes it possible to feed the ink from the ink bag 40 to the recording head. Designated at numeral 44 is a waste ink absorber 44 for catching waste ink. As the ink reservoir, one having an ink-contacting wall formed of a polyolefin, especially polyethylene is preferred.

Figure 6:
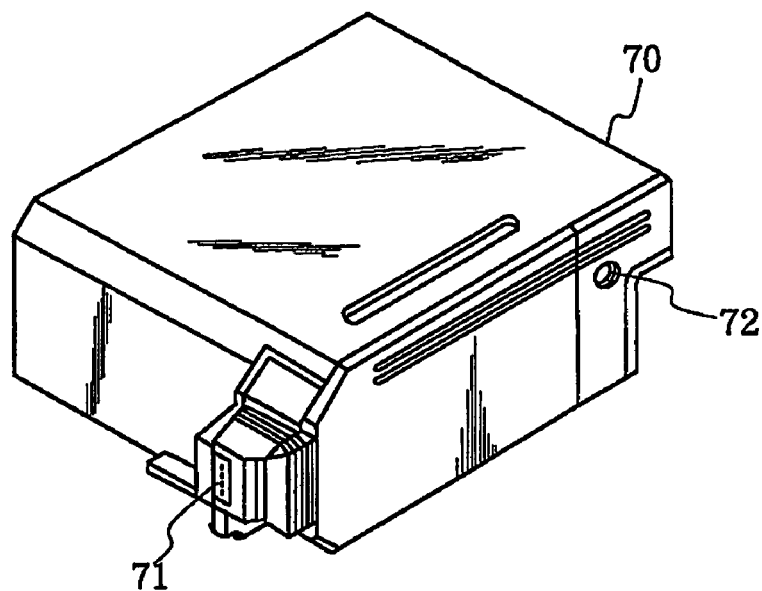
FIG. 6 is a perspective view of a recording unit usable in the inkjet recording system according to the present invention.

An inkjet recording system suitable for use in the present invention is not limited to one including a recording head and an ink cartridge as discrete members as described above but also includes one including them as an integral unit as depicted in FIG. 6. In FIG. 6, numeral 70 designates a recording unit within which an ink reservoir means with an ink stored therein, for example, an ink absorbent is accommodated, and the ink in the ink absorbent is ejected as ink droplets from a recording head unit 71 equipped with plural orifices. As the material of the ink reservoir, use of polyurethane is preferred for the present invention. As an alternative, the ink reservoir may have a structure similar to an ink bag with a spring or the like accommodated therein instead of using an ink absorbent. Numeral 72 indicates a vent hole through which the interior of the cartridge is kept in communication with the air. This recording unit 70 can be used in place of the recording head 65 shown in FIG. 4, and is detachably mounted on the carriage 66.

(Inkjet Recording System Making Use of Mechanical Energy)

As a preferred embodiment of an inkjet recording system making use of mechanical energy, an on-demand inkjet recording head can be mentioned. This on-demand inkjet recording head is provided with a nozzle-defining plate having plural nozzles therein, pressure producing elements arranged opposite the nozzles and composed of a piezoelectric material and a conductive material, and an ink filling up around these pressure producing elements. By impressed voltages, the pressure producing elements are caused to displace to eject small droplets of the ink from the nozzles. One example of the construction of the recording head as a principal element in the inkjet recording system is depicted in FIG. 7.

The recording head includes an ink channel 80 communicated with an ink reservoir (not illustrated), an orifice plate 81 for ejecting ink droplets of a desired volume, a vibration plate 82 for applying pressure directly to an ink, a piezoelectric element 83 bonded with the vibration plate 82 and displaceable by electrical signals, and a substrate 84 fixedly supporting the orifice plate 81, the vibration plate 82 and the like.

Figure 7:
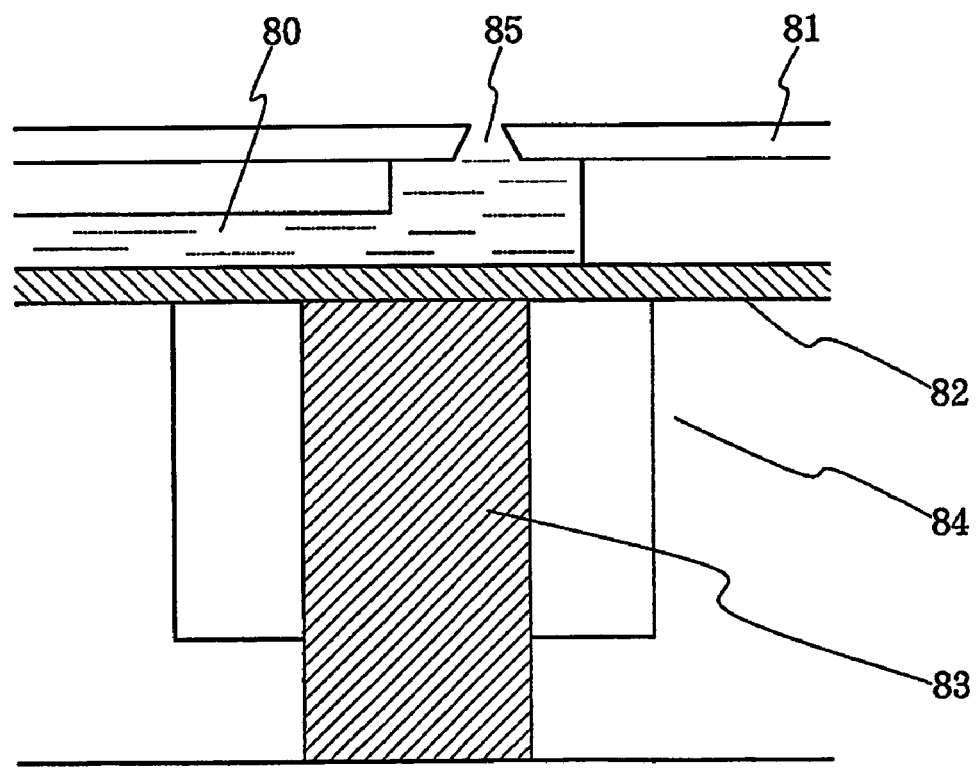
FIG. 7 is a simplified, fragmentary cross-sectional view of another recording head usable in the inkjet recording system according to the present invention.

In FIG. 7, the ink channel 80 is formed of a photo sensitive resin or the like, the orifice plate 81 defines ejection nozzles 85 formed by subjecting a metal such as stainless steel or nickel to orifice creation by electroforming or pressing, the vibration plate 82 is formed of a metal film such as a stainless steel, nickel or titanium film or a high-modulus resin film, and the piezoelectric element 83 is formed of a dielectric material such as barium titanate or PZT. The recording head of the above-described construction operates such that a pulse-like voltage is applied across the piezoelectric element 83 to produce a stress deformation (strain), its energy then deforms the vibration plate 82 bonded to the piezoelectric element 83, and hence, the ink within the ink channel 80 is vertically pressurized to eject an ink droplet (not shown) from the ejection orifice 85 of the orifice plate 71 to perform recording. Such a recording head is used by assembling it in a similar inkjet recording system as in FIG. 4. Detailed operations of the inkjet recording system may be performed in a similar manner as in the above-mentioned one.

EXAMPLES

Based on Examples, the present invention will hereinafter be described in detail. It is, however, to be noted that the present invention shall not be limited to the following Examples. In the following description, all designations of "part" or "parts" and "%" are on a weight.

Examples and Comparative Examples of Yellow Inks

Example Y-1

(Preparation of a High-Molecular Dispersant A)

Synthesis of an A-B Diblock Copolymer Formed of One Type of Hydrophobic Blocks and One Type of Hydrophilic Blocks:

A glass vessel fitted with a three-way cock was purged with nitrogen gas, and then, heated at 250° C. under a nitrogen gas atmosphere to remove any adsorbed water. After the system was allowed to cool down to room temperature, isobutyl vinyl ether (12 mmol), ethyl acetate (16 mmol), 1-isobutoxyethyl acetate (0.1 mmol) and toluene (11 cm³) were charged. When the internal temperature of the system had dropped to 0° C., ethyl aluminum sesquichloride (0.2 mmol) was added to initiate polymerization, and the A blocks of an A-B diblock copolymer was synthesized.

Using a gel permeation column chromatography (GPC), the molecular weight was monitored in a time division manner. Subsequent to the completion of the polymerization of the A blocks, a vinyl monomer (12 mmol) which had been obtained by silanizing (silylating) the hydroxyl group of 2-hydroxyethyl vinyl ether with trimethylchlorosilane was added to conduct synthesis of B blocks. Termination of the polymerization reaction was effected by adding into the system a 0.3% solution of ammonia in methanol.

Hydrolysis of hydroxyl groups silanized (silylated) with trimethylchlorosilane was effected by adding water. Subsequent to the reaction, dichloromethane was added to the reaction mixture to dilute it. The resulting mixture was washed three times with 0.6 N hydrochloric acid solution and then three times with distilled water, followed by the concentration to dryness in an evaporator. The thus dried product was dried in a vacuum to afford an A-B diblock copolymer (a high molecular dispersant A). Identification of the resultant diblock copolymer was conducted using NMR and GPC. (Mn=3.7×10⁴, Mn/Mw=1.3).

(Preparation of a Colorant Dispersion Y-I)

C.I. Solvent Yellow 21 (1.0 part), a commercially-available water-insoluble colorant, and acetone (99.0 parts) were mixed, heated to 40° C., and then thoroughly stirred into a homogeneous solution. The solution was added to a solution of the high-molecular dispersant A (1.0 part) in tetrahydrofuran (99.0 parts), and after mixing, water (10.0 parts) was added. Subsequently, acetone and tetrahydrofuran were removed by a rotary evaporator to afford a colorant dispersion Y-I. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Y-1>

| Colorant dispersion Y-I | 50.0 parts |
| Diethylene glycol | 10.0 parts |
| Thiodiglycol | 10.0 parts |
| Deionized water | 30.0 parts |

The above components were mixed and thoroughly stirred to afford the target ink Y-1. The average particle size of color dispersion particles in the resultant ink was measured by an instrument making use of the laser scattering method ("ELS-800", trade name; manufactured by OTSUKA ELECTRONICS CO., LTD.). It was found to be 45 nm.

Example Y-2

(Preparation of a Colorant Dispersion Y-II)

A colorant dispersion Y-II was obtained in a similar manner as in Example Y-1 except that the colorant was changed to C.I. Solvent Yellow 83:1, a commercially-available water-insoluble colorant. The concentrations of acetone and tetrahydrofuran in the resultant colorant, dispersion were analyzed by gas chromatography. Neither solvents were detected, resulting in the conclusion that they did not remain in the colorant dispersion.

<Preparation of an Ink Y-2>

| Colorant dispersion Y-II | 50.0 parts |
|---|---|
| Ethylene glycol | 9.0 parts |
| Glycerin | 11.0 parts |
| Deionized water | 30.0 parts |

The above components were mixed and thoroughly stirred to afford the target ink Y-2. The average particle size of color dispersion particles in the resultant ink was measured by an instrument making use of the laser scattering method ("ELS-800", trade name; manufactured by OTSUKA ELECTRONICS CO., LTD.). It was found to be 41 nm.

Example Y-3

(Preparation of a Colorant Dispersion Y-III)

A colorant dispersion Y-III was obtained in a similar manner as in Example Y-1 except that the colorant was changed to C.I. Solvent Yellow 82, a commercially-available water-insoluble colorant. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Y-3>

| Colorant dispersion Y-III | 50.0 parts |
|---|---|
| Diethylene glycol | 2.0 parts |
| 2-Pyrrolidone | 18.0 parts |
| Deionized water | 30.0 parts |

The above components were mixed and thoroughly stirred to afford the target ink Y-3. The average particle size of color dispersion particles in the resultant ink was measured by an instrument making use of the laser scattering method ("ELS-800", trade name; manufactured by OTSUKA ELECTRONICS CO., LTD.). It was found to be 49 nm.

Example Y-4

<Preparation of a High-Molecular Dispersant B>

Synthesis of an A-B Diblock Copolymer Formed of One Type of Hydrophobic Blocks and One Type of Hydrophilic Blocks:

A glass vessel fitted with a three-way cock was purged with nitrogen gas, and then, heated at 250° C. under a nitrogen gas atmosphere to remove any adsorbed water. After the system was allowed to cool down to room temperature, 2-decanoxyethyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B diblock copolymer were synthesized.

Using a column chromatography (GPC), the molecular weight was monitored in a time division manner. Subsequent to the completion of the polymerization of the A blocks, a vinyl monomer (12 mmol) which had been obtained by esterifying the carboxyl group of 4-(2-vinyloxyethoxy)benzoic acid (the B block) with an ethyl group was added to conduct synthesis of B blocks. Termination of the polymerization reaction was effected by adding into the system a 0.3% solution of ammonia in methanol.

Esterified carboxyl groups were hydrolyzed with a solution of sodium hydroxide in methanol to convert the ester form into the carboxylic acid form. Following the procedure of Example Y-1, an A-B diblock copolymer (a high molecular dispersant B) was then afforded. Identification of the resultant diblock copolymer was conducted using NMR and GPC. (Mn=3.5×10$^4$, Mn/Mw=1.2).

(Preparation of a Colorant Dispersion Y-IV)

A colorant dispersion Y-IV was obtained in a similar manner as in Example Y-1 except that the colorant was changed to C.I. Solvent Yellow 79, a commercially-available water-insoluble colorant, and the high-molecular dispersant was changed to the high-molecular dispersant B. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Y-4>

| Colorant dispersion Y-IV | 40.0 parts |
|---|---|
| Tripropylene glycol | 15.0 parts |
| Triethylene glycol | 5.0 parts |
| Deionized water | 40.0 parts |

The above components were mixed and thoroughly stirred to afford the target ink. The average particle size of color dispersion particles in the resultant ink was measured by an instrument making use of the laser scattering method ("ELS-800", trade name; manufactured by OTSUKA ELECTRONICS CO., LTD.). It was found to be 42 nm.

Example Y-5

<Preparation of a High-Molecular Dispersant C>

Synthesis of an A-B-C Triblock Copolymer Formed of One Type of Hydrophobic Blocks and Two Types of Hydrophilic Blocks:

A glass vessel fitted with a three-way cock was purged with nitrogen gas, and then, heated at 250° C. under a nitrogen gas atmosphere to remove any adsorbed water. After the system was allowed to cool down to room temperature, n-octadecyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B-C triblock copolymer was synthesized.

Using a column chromatography (GPC), the molecular weight was monitored in a time division manner. Subsequent to the completion of the polymerization of the A blocks, 2-(2-(2-(2-methoxyethoxy)ethoxy)ethoxy)ethoxyvinyl ether (B block) (24 mmol) was added, followed by continuation of polymerization. Using GPC, the molecular weight was monitored likewise. Subsequent to the completion of the polymerization of the B blocks, a vinyl monomer (12 mmol) which had been obtained by esterifying the carboxyl group of 6-(2-vinyloxyethoxy)hexanoic acid (C block) with an ethyl group was added to conduct synthesis of C blocks. Termination of the polymerization reaction was effected by adding into the system a 0.3% solution of ammonia in methanol.

Esterified carboxyl groups were hydrolyzed with a solution of sodium hydroxide in methanol to convert the ester form into the carboxylic acid form. Following the procedure of Example Y-1, an A-B-C triblock copolymer (a high molecular dispersant C) was then afforded. Identification of the resultant diblock copolymer was conducted using NMR and GPC. (Mn=$3.7\times10^4$, Mn/Mw=1.2).

(Preparation of a Colorant Dispersion Y-V)

A colorant dispersion Y-V was obtained in a similar manner as in Example Y-1 except that the colorant was changed to C.I. Solvent Yellow 42, a commercially-available water-insoluble colorant, and the high-molecular dispersant was changed to the high-molecular dispersant C. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Y-5>

| | |
|---|---|
| Colorant dispersion Y-V | 50.0 parts |
| Triethylene glycol | 20.0 parts |
| Deionized water | 30.0 parts |

The above components were mixed and thoroughly stirred to afford the target ink. The average particle size of color dispersion particles in the resultant ink was measured by an instrument making use of the laser scattering method ("ELS-800", trade name; manufactured by OTSUKA ELECTRONICS CO., LTD.). It was found to be 50 nm.

Example Y-6

(Preparation of a Colorant Dispersion Y-VI)

A colorant dispersion Y-VI was obtained in a similar manner as in Example Y-1 except that the colorant was changed to C.I. Solvent Yellow 151, a commercially-available water-insoluble colorant, and the high-molecular dispersant was changed to the high-molecular dispersant C obtained in Example Y-5. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Y-6>

| | |
|---|---|
| Colorant dispersion Y-VI | 40.0 parts |
| Diethylene glycol monomethyl ether | 30.0 parts |
| Deionized water | 30.0 parts |

The above components were mixed and thoroughly stirred to afford the target ink. The average particle size of color dispersion particles in the resultant ink was measured by an instrument making use of the laser scattering method ("ELS-800", trade name; manufactured by OTSUKA ELECTRONICS CO., LTD.). It was found to be 78 nm.

Example Y-7

<Preparation of a High-Molecular Dispersant D>

Synthesis of an A-B Diblock Copolymer Formed of One Type of Hydrophobic Blocks and One Type of Hydrophilic Blocks:

A glass vessel fitted with a three-way cock was purged with nitrogen gas, and then, heated at 250° C. under a nitrogen gas atmosphere to remove any adsorbed water. After the system was allowed to cool down to room temperature, n-octadecyl vinyl ether (12 mmol), ethyl acetate (16 mmol), 1-isobutoxyethyl acetate (0.1 mmol) and toluene (11 cm$^3$) were charged. When the internal temperature of the system had dropped to 0° C., ethyl aluminum sesquichloride (0.2 mmol) was added to initiate polymerization, and the A blocks of an A-B diblock copolymer was synthesized.

Using a column chromatography (GPC), the molecular weight was monitored in a time division manner. Subsequent to the completion of the polymerization of the A blocks, a vinyl monomer (48 mmol) which had been obtained by silanizing (silylating) the hydroxyl group of heptaethylene glycol vinyl ether with trimethylchlorosilane was added to conduct synthesis of B blocks. Termination of the polymerization reaction was effected by adding into the system a 0.3% solution of ammonia in methanol.

Hydrolysis of hydroxyl groups silanized (silylated) with trimethylchlorosilane was effected by adding water. Following the procedure of Example Y-1, an A-B diblock copolymer (a high molecular dispersant D) was then afforded. Identification of the resultant diblock copolymer was conducted using NMR and GPC. (Mn=$3.5\times10^4$, Mn/Mw=1.3).

(Preparation of a Colorant Dispersion Y-VII)

A colorant dispersion Y-VII was obtained in a similar manner as in Example Y-1 except that the colorant was changed to C.I. Solvent Yellow 88, a commercially-available oil-soluble dye, and the high-molecular dispersant was changed to the high-molecular dispersant D. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Y-7>

| | |
|---|---|
| Colorant dispersion Y-VII | 50.0 parts |
| Polyethylene glycol | 20.0 parts |
| (weight average molecular weight: 600) | |
| Deionized water | 30.0 parts |

The above components were mixed and thoroughly stirred to afford the target ink. The average particle size of color dispersion particles in the resultant ink was measured by an instrument making use of the laser scattering method ("ELS-800", trade name; manufactured by OTSUKA ELECTRONICS CO., LTD.). It was found to be 48 nm.

Comparative Example Y-1

(Preparation of a Colorant Dispersion Y-VIII)

A colorant dispersion Y-VIII was obtained in a similar manner as in Example Y-1 except that a styrene-maleic acid random copolymer (number average molecular weight: 10,000) was used as a high-molecular dispersant.

<Preparation of an Ink Y-8>

| Colorant dispersion Y-VIII | 50.0 parts |
| Diethylene glycol | 10.0 parts |
| Thiodiglycol | 10.0 parts |
| Deionized water | 30.0 parts |

The above components were mixed and thoroughly stirred to afford a yellow ink.

Comparative Example Y-2

(Preparation of a Colorant Dispersion Y-IX)

A colorant dispersion Y-IX was obtained in a similar manner as in Example Y-1 except that an n-butyl methacrylate-methacrylic acid block copolymer (number average molecular weight: 10,000) was used as a high-molecular dispersant.

<Preparation of an Ink Y-9>

| Colorant dispersion Y-IX | 50.0 parts |
| Diethylene glycol | 10.0 parts |
| Thiodiglycol | 10.0 parts |
| Deionized water | 30.0 parts |

The above components were mixed and thoroughly stirred to afford a yellow ink.

Comparative Example Y-3

(Preparation of a Colorant Dispersion Y-X)

A colorant dispersion Y-X was obtained in a similar manner as in Example Y-1 except that C.I. Solvent Yellow 151 was used as a colorant and polyoxyethylene hexadecyl ether (HLB 12.9) was used as a dispersant.

<Preparation of an Ink Y-10>

| Colorant dispersion Y-X | 50.0 parts |
| Tripropylene glycol | 20.0 parts |
| Deionized water | 30.0 parts |

The above components were mixed and thoroughly stirred to afford a yellow ink.

Comparative Example Y-4

(Preparation of a Colorant Dispersion Y-XI)

C.I. Pigment Yellow 138 (10.0 parts), a commercially-available pigment, a styrene-maleic acid random copolymer (number average molecular weight: 10,000) (5.0 parts) and deionized water (85.0 parts) were combined, and thoroughly stirred and mixed by an ultra-homogenizer such that the pigment and copolymer were evenly dispersed to afford a colorant dispersion Y-XI.

<Preparation of an Ink Y-11>

| Colorant dispersion Y-XI | 50.0 parts |
| Tripropylene glycol | 20.0 parts |
| Deionized water | 30.0 parts |

The above components were mixed and thoroughly stirred to afford a yellow ink.

Comparative Example Y-5

<Preparation of an Ink Y-12>

| C.I. Direct Yellow 86 | 5.0 parts |
| Tripropylene glycol | 20.0 parts |
| Deionized water | 75.0 parts |

The above components were mixed and thoroughly stirred to afford a yellow ink.

(Ranking)

The inks of Examples Y-1 to Y-7 and those of Comparative Examples Y-1 to Y-5 were separately loaded on an inkjet recording system equipped with an on-demand multiple-nozzle recording head that ejects each ink by applying to the ink thermal energy corresponding to each recording signal, "BJF-660" (trade name, manufactured by Canon Inc.), and printing was performed on glossy paper, "SP101" (trade name, product of Canon Inc.), to rank the inks in ejection stability, image quality, light fastness and waterproofness. As presented in Table 1, all the inks of the Examples gave better results in ejection stability, image quality, light fastness and waterproofness than all the inks of the Comparative Examples.

TABLE 1

Ranking Results

Ranked characteristics

| | Ejection stability*1 | Image quality*2 | Light fastness*3 | Water-proofness*4 |
|---|---|---|---|---|
| Example Y-1 | A | A | A | A |
| Example Y-2 | A | A | A | A |
| Example Y-3 | A | A | A | A |
| Example Y-4 | A | A | A | A |
| Example Y-5 | A | A | A | A |
| Example Y-6 | B | A | A | A |
| Example Y-7 | A | A | A | A |
| Comp.Ex. Y-1 | D | D | B | B |
| Comp.Ex. Y-2 | C | C | B | A |
| Comp.Ex. Y-3 | D | D | B | B |

TABLE 1-continued

Ranking Results

| | Ranked characteristics | | | |
|---|---|---|---|---|
| | Ejection stability*1 | Image quality*2 | Light fastness*3 | Water-proofness*4 |
| Comp.Ex. Y-4 | C | D | A | B |
| Comp.Ex. Y-5 | B | B | C | C |

*1Ejection stability
Under an environment of 5° C. and 10% R.H., a 100% solid image was printed. After the printing was stopped for 1 minute, a 100% solid image was printed again. The latter 100% solid image was ranked in accordance with the following ranking standards.
A: Normally printed without any white streak.
B: Slight white streaks were observed at the beginning of the print.
C: White streaks were observed over the entire image.
D: Practically no image was printed.
*2Image quality
Under an environment of 5° C. and 10% R.H., a crosshatch pattern was printed with 25 mm interline spacings, and the image so printed was ranked in accordance with the following ranking standards.
A: No printing disorder was observed at all even under a microscope, and the crosshatch pattern was normally printed with 25 mm interline spacings.
B: Some printing disorder was locally observed under a microscope, but the crosshatch pattern was normally printed with 25 mm interline spacings.
C: Some printing disorder was locally observed even with the naked eye, and the crosshatch pattern was locally offset from 25 mm interline spacings.
D: Printing disorder was observed with the naked eye over the entire crosshatch pattern, and the crosshatch pattern was offset from 25 mm interline spacings at the entire area thereof.
*3Light fastness
A print was exposed to light for 100 hours under a Xenon lamp. The reflection density of the image was measured both before and after the exposure. A percent remainder of the image density after the light fastness test was determined as a scale of light fastness. The following ranking standards were followed.
A: Percent remainder of image density $\geq$ 95%
B: 95% > Percent remainder of image density $\geq$ 90%
C: 90% > Percent remainder of image density
*4Waterproofness
After a printed paper had been left over for 12 hours or longer subsequent to its printing, the reflection density of the image was measured. Further, the printed paper was kept still for 5 minutes in tap water. After water was dried off, the reflection density of the image was measured to determine, as a scale of waterproofness, a percent remainder of the image density after the waterproofness test. Ranking was performed in accordance with the following ranking standards.
A: Percent remainder of image density $\geq$ 90%
B: 90% > Percent remainder of image density $\geq$ 80%
C: 80% > Percent remainder of image density Examples and Comparative Examples of Magenta Inks As high-molecular dispersants, the above-described high-molecular dispersants A to C were used.

Example M-1

(Preparation of a Colorant Dispersion M-I)
C.I. Solvent Red 218 (1.0 part), a commercially-available water-insoluble colorant, and acetone (99.0 parts) were mixed, heated to 40° C., and then thoroughly stirred into a homogeneous solution. The solution was added to a solution of the high-molecular dispersant A (1.0 part) in tetrahydrofuran (99.0 parts), and after mixing, water (10.0 parts) was added. Subsequently, acetone and tetrahydrofuran were removed by a rotary evaporator to afford a colorant dispersion M-I. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink M-1>

| Colorant dispersion M-I | 50.0 parts |
|---|---|
| Diethylene glycol | 10.0 parts |
| Thiodiglycol | 10.0 parts |
| Deionized water | 30.0 parts |

The above components were mixed and thoroughly stirred to afford the target ink M-1. The average particle size of color dispersion particles in the resultant ink was measured by an instrument making use of the laser scattering method ("ELS-800", trade name; manufactured by OTSUKA ELECTRONICS CO., LTD.). It was found to be 43 nm.

Example M-2

(Preparation of a Colorant Dispersion M-II)
A colorant dispersion M-II was obtained in a similar manner as in Example M-1 except that the colorant was changed to C.I. Solvent Red 91, a commercially-available water-insoluble colorant. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink M-2>

| Colorant dispersion M-II | 50.0 parts |
|---|---|
| Ethylene glycol | 9.0 parts |
| Glycerin | 11.0 parts |
| Deionized water | 30.0 parts |

The above components were mixed and thoroughly stirred to afford the target ink M-2. The average particle size of color dispersion particles in the resultant ink was measured by an instrument making use of the laser scattering method ("ELS-800", trade name; manufactured by OTSUKA ELECTRONICS CO., LTD.). It was found to be 48 nm.

Example M-3

(Preparation of a Colorant Dispersion M-III)
A colorant dispersion M-III was obtained in a similar manner as in Example M-1 except that the colorant was changed to C.I. Solvent Red 49, a commercially-available water-insoluble colorant, and the high-molecular dispersant was changed to the high-molecular dispersant B. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink M-3>

| Colorant dispersion M-III | 40.0 parts |
|---|---|
| Tripropylene glycol | 15.0 parts |
| Triethylene glycol | 5.0 parts |
| Deionized water | 40.0 parts |

The above components were mixed and thoroughly stirred to afford the target ink M-3. The average particle size of color dispersion particles in the resultant ink was measured by an instrument making use of the laser scattering method ("ELS-800", trade name; manufactured by OTSUKA ELECTRONICS CO., LTD.). It was found to be 46 nm.

Example M-4

(Preparation of a Colorant Dispersion M-IV)

A colorant dispersion M-IV was obtained in a similar manner as in Example M-1 except that the colorant was changed to C.I. Solvent Red 8, a commercially-available water-insoluble colorant, and the high-molecular dispersant was changed to the high-molecular dispersant B. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink M-4>

| Colorant dispersion M-IV | 40.0 parts |
|---|---|
| Tripropylene glycol | 15.0 parts |
| Triethylene glycol | 5.0 parts |
| Deionized water | 40.0 parts |

The above components were mixed and thoroughly stirred to afford the target ink M-4. The average particle size of color dispersion particles in the resultant ink was measured by an instrument making use of the laser scattering method ("ELS-800", trade name; manufactured by OTSUKA ELECTRONICS CO., LTD.). It was found to be 72 nm.

Example M-5

(Preparation of a Colorant Dispersion M-V)

A colorant dispersion M-V was obtained in a similar manner as in Example M-1 except that the colorant was changed to C.I. Solvent Red 127, a commercially-available water-insoluble colorant, and the high-molecular dispersant was changed to the high-molecular dispersant C. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink M-5>

| Colorant dispersion M-V | 50.0 parts |
|---|---|
| Triethylene glycol | 20.0 parts |
| Deionized water | 30.0 parts |

The above components were mixed and thoroughly stirred to afford the target ink M-5. The average particle size of color dispersion particles in the resultant ink was measured by an instrument making use of the laser scattering method ("ELS-800", trade name; manufactured by OTSUKA ELECTRONICS CO., LTD.). It was found to be 41 nm.

Example M-6

(Preparation of a Colorant Dispersion M-VI)

A colorant dispersion M-VI was obtained in a similar manner as in Example M-1 except that the colorant was changed to C.I. Solvent Red 83:1, a commercially-available water-insoluble colorant, and the high-molecular dispersant was changed to the high-molecular dispersant C used in Example M-5. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink M-6>

| Colorant dispersion M-VI | 40.0 parts |
|---|---|
| Diethylene glycol monomethyl ether | 30.0 parts |
| Deionized water | 30.0 parts |

The above components were mixed and thoroughly stirred to afford the target ink M-6. The average particle size of color dispersion particles in the resultant ink was measured by an instrument making use of the laser scattering method ("ELS-800", trade name; manufactured by OTSUKA ELECTRONICS CO., LTD.). It was found to be 67 nm.

Comparative Example M-1

(Preparation of a Colorant Dispersion M-VII)

A colorant dispersion M-VII was obtained in a similar manner as in Example M-1 except that a styrene-maleic acid random copolymer (number average molecular weight: 10,000) was used as a high-molecular dispersant.

<Preparation of an Ink M-7>

| Colorant dispersion M-VII | 50.0 parts |
|---|---|
| Diethylene glycol | 10.0 parts |
| Thiodiglycol | 10.0 parts |
| Deionized water | 30.0 parts |

The above components were mixed and thoroughly stirred to afford a magenta ink.

Comparative Example M-2

(Preparation of a Colorant Dispersion M-VIII)

A colorant dispersion M-VIII was obtained in a similar manner as in Example M-1 except that an n-butyl methacrylate-methacrylic acid block copolymer (number average molecular weight: 10,000) was used as a high-molecular dispersant.

<Preparation of an Ink M-8>

| | |
|---|---|
| Colorant dispersion M-VIII | 50.0 parts |
| Diethylene glycol | 10.0 parts |
| Thiodiglycol | 10.0 parts |
| Deionized water | 30.0 parts |

The above components were mixed and thoroughly stirred to afford a magenta ink.

Comparative Example M-3

(Preparation of a Colorant Dispersion M-IX)

A colorant dispersion M-IX was obtained in a similar manner as in Example M-1 except that C.I. Solvent Red 91 used in Example M-2 was used and polyoxyethylene hexadecyl ether (HLB 12.9) was used as a dispersant.

<Preparation of an Ink M-9>

| | |
|---|---|
| Colorant dispersion M-IX | 50.0 parts |
| Tripropylene glycol | 20.0 parts |
| Deionized water | 30.0 parts |

The above components were mixed and thoroughly stirred to afford a magenta ink.

Comparative Example M-4

(Preparation of a Colorant Dispersion M-X)

C.I. Pigment Red 122 (10.0 parts), a commercially-available pigment, a styrene-maleic acid random copolymer (number average molecular weight: 10,000) (5.0 parts) and deionized water (85.0 parts) were combined, and thoroughly stirred and mixed by an ultra-homogenizer such that the pigment and copolymer were evenly dispersed to afford a colorant dispersion M-X.

<Preparation of an Ink M-10>

| | |
|---|---|
| Colorant dispersion M-X | 50.0 parts |
| Tripropylene glycol | 20.0 parts |
| Deionized water | 30.0 parts |

The above components were mixed and thoroughly stirred to afford a magenta ink.

Comparative Example M-5

<Preparation of an Ink M-11>

| | |
|---|---|
| C.I. Direct Red 80 | 5.0 parts |
| Tripropylene glycol | 20.0 parts |
| Deionized water | 75.0 parts |

The above components were mixed and thoroughly stirred to afford a magenta ink.

(Ranking)

The inks of Examples M-1 to M-6 and those of Comparative Examples M-1 to M-5 were ranked in a similar manner and in accordance with similar ranking standards as in the case of the above-described yellow inks. As presented in Table 2, all the inks of the Examples gave better results in ejection stability, image quality, light fastness and waterproofness than all the inks of the Comparative Examples.

TABLE 2

Ranking Results

| | Ranked characteristics | | | |
|---|---|---|---|---|
| | Ejection stability | Image quality | Light fastness | Waterproofness |
| Example M-1 | A | A | A | A |
| Example M-2 | A | A | A | A |
| Example M-3 | A | A | A | A |
| Example M-4 | B | A | A | A |
| Example M-5 | A | A | A | A |
| Example M-6 | B | A | A | A |
| Comp. Ex. M-1 | D | D | B | B |
| Comp. Ex. M-2 | C | C | B | A |
| Comp. Ex. M-3 | D | D | B | B |
| Comp. Ex. M-4 | C | D | A | B |
| Comp. Ex. M-5 | B | B | C | C |

Examples and Comparative Examples of Black Inks

As high-molecular dispersants, the above-described high-molecular dispersants A to C were used.

Example Bk-1

(Preparation of a Colorant Dispersion Bk-I)

C.I. Solvent Black 27 (1.0 part), a commercially-available water-insoluble colorant, and acetone (99.0 parts) were mixed, heated to 40° C., and then thoroughly stirred into a homogeneous solution. The solution was added to a solution of the high-molecular dispersant A (1.0 part) in tetrahydrofuran (99.0 parts), and after mixing, water (10.0 parts) was added. Subsequently, acetone and tetrahydrofuran were removed by a rotary evaporator to afford a colorant dispersion Bk-I. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Bk-1>

| | |
|---|---|
| Colorant dispersion Bk-I | 50.0 parts |
| Diethylene glycol | 10.0 parts |
| Thiodiglycol | 10.0 parts |
| Deionized water | 30.0 parts |

The above components were mixed and thoroughly stirred to afford the target ink Bk-1. The average particle size of color dispersion particles in the resultant ink was measured by an instrument making use of the laser scattering method ("ELS-800", trade name; manufactured by OTSUKA ELECTRONICS CO., LTD.). It was found to be 46 nm.

Example Bk-2

(Preparation of a Colorant Dispersion BK-II)

A colorant dispersion Bk-II was obtained in a similar manner as in Example Bk-1 except that the colorant was changed to C.I. Solvent Black 3, a commercially-available water-insoluble colorant. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Bk-2>

| | |
|---|---|
| Colorant dispersion Bk-II | 50.0 parts |
| Ethylene glycol | 9.0 parts |
| Glycerin | 11.0 parts |
| Deionized water | 30.0 parts |

The above components were mixed and thoroughly stirred to afford the target ink Bk-2. The average particle size of color dispersion particles in the resultant ink was measured by an instrument making use of the laser scattering method ("ELS-800", trade name; manufactured by OTSUKA ELECTRONICS CO., LTD.). It was found to be 45 nm.

Example Bk-3

(Preparation of a Colorant Dispersion Bk-III)

A colorant dispersion Bk-III was obtained in a similar manner as in Example Bk-1 except that the colorant was changed to C.I. Solvent Black 29, a commercially-available water-insoluble colorant, and the high-molecular dispersant was changed to the high-molecular dispersant B. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Bk-3>

| | |
|---|---|
| Colorant dispersion Bk-III | 40.0 parts |
| Tripropylene glycol | 15.0 parts |
| Triethylene glycol | 5.0 parts |
| Deionized water | 40.0 parts |

The above components were mixed and thoroughly stirred to afford the target ink Bk-3. The average particle size of color dispersion particles in the resultant ink was measured by an instrument making use of the laser scattering method ("ELS-800", trade name; manufactured by OTSUKA ELECTRONICS CO., LTD.). It was found to be 41 nm.

Example Bk-4

(Preparation of a Colorant Dispersion Bk-IV)

A colorant dispersion Bk-IV was obtained in a similar manner as in Example Bk-1 except that the colorant was changed to C.I. Solvent Black 45, a commercially-available water-insoluble colorant, and the high-molecular dispersant was changed to the high-molecular dispersant C. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink Bk-4>

| | |
|---|---|
| Colorant dispersion Bk-IV | 50.0 parts |
| Triethylene glycol | 20.0 parts |
| Deionized water | 30.0 parts |

The above components were mixed and thoroughly stirred to afford the target ink Bk-4. The average particle size of color dispersion particles in the resultant ink was measured by an instrument making use of the laser scattering method ("ELS-800", trade name; manufactured by OTSUKA ELECTRONICS CO., LTD.). It was found to be 43 nm.

Comparative Example Bk-1

(Preparation of a Colorant Dispersion Bk-V)

A colorant dispersion Bk-V was obtained in a similar manner as in Example Bk-1 except that a styrene-maleic acid random copolymer (number average molecular weight: 10,000) was used as a high-molecular dispersant.

<Preparation of an Ink Bk-5>

| | |
|---|---|
| Colorant dispersion Bk-V | 50.0 parts |
| Diethylene glycol | 10.0 parts |
| Thiodiglycol | 10.0 parts |
| Deionized water | 30.0 parts |

The above components were mixed and thoroughly stirred to afford a black ink.

Comparative Example Bk-2

(Preparation of a Colorant Dispersion Bk-VI)

A colorant dispersion Bk-VI was obtained in a similar manner as in Example Bk-1 except that an n-butyl methacrylate-methacrylic acid block copolymer (number average molecular weight: 10,000) was used as a high-molecular dispersant.

<Preparation of an Ink Bk-6>

| | |
|---|---|
| Colorant dispersion Bk-VI | 50.0 parts |
| Diethylene glycol | 10.0 parts |
| Thiodiglycol | 10.0 parts |
| Deionized water | 30.0 parts |

The above components were mixed and thoroughly stirred to afford a black ink.

Comparative Example Bk-3

(Preparation of a Colorant Dispersion Bk-VII)

A colorant dispersion Bk-VII was obtained in a similar manner as in Example Bk-1 except that C.I. Solvent Black 3 used in Example Bk-2 was used and polyoxyethylene hexadecyl ether (HLB 12.9) was used as a dispersant.

<Preparation of an Ink Bk-7>

| | |
|---|---|
| Colorant dispersion Bk-VII | 50.0 parts |
| Tripropylene glycol | 20.0 parts |
| Deionized water | 30.0 parts |

The above components were mixed and thoroughly stirred to afford a black ink.

Comparative Example Bk-4

(Preparation of a Colorant Dispersion Bk-VIII)

C.I. Pigment Black 7 (10.0 parts), a commercially-available pigment, a styrene-maleic acid random copolymer (number average molecular weight: 10,000) (5.0 parts) and deionized water (85.0 parts) were combined, and thoroughly stirred and mixed by an ultra-homogenizer such that the pigment and copolymer were evenly dispersed to afford a colorant dispersion Bk-VIII.

<Preparation of an Ink Bk-8>

| | |
|---|---|
| Colorant dispersion Bk-VIII | 50.0 parts |
| Tripropylene glycol | 20.0 parts |
| Deionized water | 30.0 parts |

The above components were mixed and thoroughly stirred to afford a black ink.

Comparative Example Bk-5

<Preparation of an Ink Bk-9>

| | |
|---|---|
| C.I. Direct Black 17 | 5.0 parts |
| Tripropylene glycol | 20.0 parts |
| Deionized water | 75.0 parts |

The above components were mixed and thoroughly stirred to afford a black ink.

(Ranking)

The inks of Examples Bk-1 to Bk-4 and those of Comparative Examples Bk-1 to Bk-5 were ranked in a similar manner and in accordance with similar ranking standards as in the case of the above-described yellow inks. As presented in Table 3, all the inks of the Examples gave better results in ejection stability, image quality, light fastness and waterproofness than all the inks of the Comparative Examples.

TABLE 3

Ranking Results

| | Ranked characteristics | | | |
|---|---|---|---|---|
| | Ejection stability | Image quality | Light fastness | Water-proofness |
| Example Bk-1 | A | A | A | A |
| Example Bk-2 | A | A | A | A |
| Example Bk-3 | A | A | A | A |
| Example Bk-4 | A | A | A | A |
| Comp. Ex. Bk-1 | D | D | B | B |
| Comp. Ex. Bk-2 | C | C | B | A |
| Comp. Ex. Bk-3 | D | D | B | B |
| Comp. Ex. Bk-4 | C | D | A | B |
| Comp. Ex. Bk-5 | B | B | C | C |

Examples and Comparative Examples of Cyan Inks

As high-molecular dispersants, the above-described high-molecular dispersants A to C were used.

Example C-1

(Preparation of a Colorant Dispersion C-I)

C.I. Solvent Blue 44 (1.0 part), a commercially-available water-insoluble colorant, and acetone (99.0 parts) were mixed, heated to 40° C., and then thoroughly stirred into a homogeneous solution. The solution was added to a solution of the high-molecular dispersant A (1.0 part) in tetrahydrofuran (99.0 parts), and after mixing, water (10.0 parts) was added. Subsequently, acetone and tetrahydrofuran were removed by a rotary evaporator to afford a colorant dispersion C-I. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink C-1>

|  |  |
|---|---|
| Colorant dispersion C-I | 50.0 parts |
| Diethylene glycol | 10.0 parts |
| Thiodiglycol | 10.0 parts |
| Deionized water | 30.0 parts |

The above components were mixed and thoroughly stirred to afford the target ink C-1. The average particle size of color dispersion particles in the resultant ink was measured by an instrument making use of the laser scattering method ("ELS-800", trade name; manufactured by OTSUKA ELECTRONICS CO., LTD.). It was found to be 47 nm.

Example C-2

(Preparation of a Colorant Dispersion C-II)

A colorant dispersion C-II was obtained in a similar manner as in Example C-1 except that the colorant was changed to C.I. Solvent Blue 25, a commercially-available water-insoluble colorant. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink C-2>

|  |  |
|---|---|
| Colorant dispersion C-II | 50.0 parts |
| Ethylene glycol | 9.0 parts |
| Glycerin | 11.0 parts |
| Deionized water | 30.0 parts |

The above components were mixed and thoroughly stirred to afford the target ink C-2. The average particle size of color dispersion particles in the resultant ink was measured by an instrument making use of the laser scattering method ("ELS-800", trade name; manufactured by OTSUKA ELECTRONICS CO., LTD.). It was found to be 42 nm.

Example C-3

(Preparation of a Colorant Dispersion C-III)

A colorant dispersion C-III was obtained in a similar manner as in Example C-1 except that the colorant was changed to C.I. Solvent Blue 67, a commercially-available water-insoluble colorant, and the high-molecular dispersant was changed to the high-molecular dispersant B. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink C-3>

|  |  |
|---|---|
| Colorant dispersion C-III | 40.0 parts |
| Tripropylene glycol | 15.0 parts |
| Triethylene glycol | 5.0 parts |
| Deionized water | 40.0 parts |

The above components were mixed and thoroughly stirred to afford the target ink C-3. The average particle size of color dispersion particles in the resultant ink was measured by an instrument making use of the laser scattering method ("ELS-800", trade name; manufactured by OTSUKA ELECTRONICS CO., LTD.). It was found to be 45 nm.

Example C-4

(Preparation of a Colorant Dispersion C-IV)

A colorant dispersion C-IV was obtained in a similar manner as in Example C-1 except that the colorant was changed to C.I. Solvent Blue 70, a commercially-available water-insoluble colorant, and the high-molecular dispersant was changed to the high-molecular dispersant C. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink C-4>

|  |  |
|---|---|
| Colorant dispersion C-IV | 50.0 parts |
| Triethylene glycol | 20.0 parts |
| Deionized water | 30.0 parts |

The above components were mixed and thoroughly stirred to afford the target ink. The average particle size of color dispersion particles in the resultant ink was measured by an instrument making use of the laser scattering method ("ELS-800", trade name; manufactured by OTSUKA ELECTRONICS CO., LTD.). It was found to be 47 mm.

Example C-5

(Preparation of a Colorant Dispersion C-V)

A colorant dispersion C-V was obtained in a similar manner as in Example C-1 except that the colorant was changed to C.I. Solvent Blue 38, a commercially-available water-insoluble colorant, and the high-molecular dispersant was changed to the high-molecular dispersant C used in Example C-4. The concentrations of acetone and tetrahydrofuran in the resultant colorant dispersion were analyzed by gas chromatography. Neither solvents were detected, resulting in the conclusion that they did not remain in the colorant dispersion.

<Preparation of an Ink C-5>

| | | |
|---|---|---|
| Colorant dispersion C-V | 50.0 parts | |
| Triethylene glycol | 20.0 parts | |
| Deionized water | 30.0 parts | |

The above components were mixed and thoroughly stirred to afford the target ink. The average particle size of color dispersion particles in the resultant ink was measured by an instrument making use of the laser scattering method ("ELS-800", trade name; manufactured by OTSUKA ELECTRONICS CO., LTD.). It was found to be 59 nm.

Comparative Example C-1

(Preparation of a Colorant Dispersion C-VI)

A colorant dispersion C-VI was obtained in a similar manner as in Example C-1 except that a styrene-maleic acid random copolymer (number average molecular weight: 10,000) was used as a high-molecular dispersant.

<Preparation of an Ink C-6>

| | |
|---|---|
| Colorant dispersion C-VI | 50.0 parts |
| Diethylene glycol | 10.0 parts |
| Thiodiglycol | 10.0 parts |
| Deionized water | 30.0 parts |

The above components were mixed and thoroughly stirred to afford a cyan ink.

Comparative Example C-2

(Preparation of a Colorant Dispersion C-VII)

A colorant dispersion C-VII was obtained in a similar manner as in Example C-1 except that an n-butyl methacrylate-methacrylic acid block copolymer (number average molecular weight: 10,000) was used as a high-molecular dispersant.

<Preparation of an Ink C-7>

| | |
|---|---|
| Colorant dispersion C-VII | 50.0 parts |
| Diethylene glycol | 10.0 parts |
| Thiodiglycol | 10.0 parts |
| Deionized water | 30.0 parts |

The above components were mixed and thoroughly stirred to afford a cyan ink.

Comparative Example C-3

(Preparation of a Colorant Dispersion C-VIII)

A colorant dispersion C-VIII was obtained in a similar manner as in Example C-1 except that C.I. Solvent Blue 25 used in Example C-2 was used and polyoxyethylene hexadecyl ether (HLB 12.9) was used as a dispersant.

<Preparation of an Ink C-8>

| | |
|---|---|
| Colorant dispersion C-VIII | 50.0 parts |
| Tripropylene glycol | 20.0 parts |
| Deionized water | 30.0 parts |

The above components were mixed and thoroughly stirred to afford a cyan ink.

Comparative Example C-4

(Preparation of a Colorant Dispersion C-IX)

C.I. Pigment Blue 15:3 (10.0 parts), a commercially-available pigment, a styrene-maleic acid random copolymer (number average molecular weight: 10,000) (5.0 parts) and deionized water (85.0 parts) were combined, and thoroughly stirred and mixed by an ultra-homogenizer such that the pigment and copolymer were evenly dispersed to afford a colorant dispersion C-IX.

<Preparation of an Ink C-9>

| | |
|---|---|
| Colorant dispersion C-IX | 50.0 parts |
| Tripropylene glycol | 20.0 parts |
| Deionized water | 30.0 parts |

The above components were mixed and thoroughly stirred to afford a cyan ink.

Comparative Example C-5

<Preparation of an Ink C-10>

| | |
|---|---|
| C.I. Direct Blue 199 | 5.0 parts |
| Tripropylene glycol | 20.0 parts |
| Deionized water | 75.0 parts |

The above components were mixed and thoroughly stirred to afford a cyan ink.

(Ranking)

The inks of Examples C-1 to C-5 and those of Comparative Examples C-1 to C-5 were ranked in a similar manner and in accordance with similar ranking standards as in the case of the above-described yellow inks. As presented in Table 4, all the inks of the Examples gave better results in ejection stability, image quality, light fastness and waterproofness than all the inks of the Comparative Examples.

TABLE 4

| | Ranking Results | | | |
|---|---|---|---|---|
| | Ranked characteristics | | | |
| | Ejection stability | Image quality | Light fastness | Water-proofness |
| Example C-1 | A | A | A | A |

TABLE 4-continued

Ranking Results

| | Ranked characteristics | | | |
|---|---|---|---|---|
| | Ejection stability | Image quality | Light fastness | Water-proofness |
| Example C-2 | A | A | A | A |
| Example C-3 | A | A | A | A |
| Example C-4 | A | A | A | A |
| Example C-5 | B | A | A | A |
| Comp. Ex. C-1 | D | D | B | B |
| Comp. Ex. C-2 | C | C | B | A |
| Comp. Ex. C-3 | D | D | B | B |
| Comp. Ex. C-4 | C | D | A | B |
| Comp. Ex. C-5 | B | B | C | C |

INDUSTRIAL APPLICABILITY

As has been described above, the present invention can provide inks capable of stably recording images of high fastness and excellent quality over a long period even under severe environmental conditions, and can also provide an inkjet recording method, ink cartridges and inkjet recording systems all of which make it possible to record images of superb fastness and quality.

The invention claimed is:

1. An inkjet recording ink composed of
an encapsulated water-insoluble colorant encapsulated with a high-molecular dispersant;
a water-soluble organic solvent;
water; and
a water-insoluble colorant is at least one colorant selected from the group consisting of C.I. Solvent Yellow 21, C.I. Solvent Yellow 42, C.I. Solvent Yellow 79, C.I. Solvent Yellow 82, C.I. Solvent Yellow 83:1, C.I. Solvent Yellow 88 and C.I. Solvent Yellow 151, at least one colorant selected from the group consisting of C.I. Solvent Red 8, C.I. Solvent Red 49, C.I. Solvent Red 83:1, C.I. Solvent Red 91, C.I. Solvent Red 127 and C.I. Solvent Red 218, at least one colorant selected from the group consisting of C.I. Solvent Black 3, C.I. Solvent Black 27, C.I. Solvent Black 29 and C.I. Solvent Black 45, or at least one colorant selected from the group consisting of C.I. Solvent Blue 25, C.I. Solvent Blue 38, C.I. Solvent Blue 44, C.I. Solvent Blue 67 and C.I. Solvent Blue 70
wherein said high-molecular dispersant is a block copolymer comprising at least one hydrophobic block and at least one hydrophilic block, and said at least one hydrophobic block and at least one hydrophilic block have been obtained by polymerizing vinyl ethers as monomers, respectively; wherein said at least one hydrophilic block in said high-molecular dispersant is formed of an anionic vinyl ether.

2. The ink jet recording ink according to claim 1, wherein said at least one hydrophilic block in said high-molecular dispersant is formed of at least two blocks consisting of a block formed of a nonionic vinyl ether and a block formed of an anionic vinyl ether.

3. The inkjet recording ink according to claim 1, wherein said high-molecular dispersant comprises at least three block consisting of a block formed of one of hydrophobic vinyl ethers, a block formed of one of nonionic hydrophilic vinyl ethers and a block formed of one of anionic hydrophilic vinyl ethers.

4. The inkjet recording ink according to claim 1, wherein said block copolymer has a number average molecular weight of from 500 to 20,000,000.

5. The inkjet recording ink according to claim 1, wherein particles of said encapsulated water-insoluble colorant dispersed by said high-molecular dispersant have an average particle size not greater than 80 nm.

6. An inkjet recording method, which is conducted by applying energy to an ink to cause said ink to fly onto a recording medium, wherein said ink is an ink as defined in claim 1.

7. The inkjet recording method according to claim 6, wherein said energy is thermal energy.

8. The inkjet recording method according to claim 6, wherein said recording medium has an ink-receiving coating layer on at least one of opposite sides thereof.

9. An ink cartridge provided with an ink reservoir with an ink stored therein, wherein said ink is an ink as defined in claim 1.

10. An inkjet recording system provided with an ink cartridge, which is provided with an ink reservoir with an ink stored therein, and also with a recording head portion for ejecting said ink, wherein said ink is an ink as defined in claim 1.

11. The ink jet recording ink according to claim 1, wherein the anionic vinyl ether has a carboxyl group as a side chain.

12. An ink jet recording ink, comprising
an encapsulated water-insoluble colorant encapsulated with a high-molecular dispersant, characterized in that said high-molecular dispersant is a block copolymer including at least three blocks, wherein said three blocks consist of a first block formed of one of hydrophobic vinyl ethers, a second block formed of one of nonionic hydrophilic vinyl ethers and a third block formed of one of anionic hydrophilic vinyl ethers;
a water-soluble organic solvent;
water; and
a water-insoluble colorant is at least one colorant selected from the group consisting of C.I. Solvent Yellow 21, C.I. Solvent Yellow 42, C.I. Solvent Yellow 79, C.I. Solvent Yellow 82, C.I. Solvent Yellow 83:1, C.I. Solvent Yellow 88 and C.I. Solvent Yellow 151, at least one colorant selected from the group consisting of C.I. Solvent Red 8, C.I. Solvent Red 49, C.I. Solvent Red 83:1, C.I. Solvent Red 91, C.I. Solvent Red 127 and C.I. Solvent Red 218, at least one colorant selected from the group consisting of C.I. Solvent Black 3, C.I. Solvent Black 27, C.I. Solvent Black 29 and C.I. Solvent Black 45, or at least one colorant selected from the group consisting of C.I. Solvent Blue 25, C.I. Solvent Blue 38, C.I. Solvent Blue 44, C.I. Solvent Blue 67 and C.I. Solvent Blue 70.

13. The ink jet recording ink according to claim 12, wherein said anionic hydrophilic vinyl ethers have a carboxyl group as a side chain.

14. The ink jet recording ink according to claim 12, wherein said block copolymer is sequentially formed of said first block, said second block and said third block, further wherein said first block is formed of a hydrophobic polyvinyl ether, said second block is formed of a nonionic hydrophilic polyvinyl ether and said third block is formed of an anionic hydrophilic polyvinyl ether.

* * * * *